United States Patent
Malnar et al.

[15] 3,651,394
[45] Mar. 21, 1972

[54] DIFFUSED LIGHT DETECTING CELL FOR AND IN OPTICAL PUMPING APPARATUS

[72] Inventors: Leon Malnar; Jean-Louis Meilleroux, both of Paris, France

[73] Assignee: Thomson-CSF, Paris, France

[22] Filed: Apr. 14, 1970

[21] Appl. No.: 28,491

Related U.S. Application Data

[63] Continuation-in-part of Ser. No. 667,557, Sept. 13, 1967, abandoned.

[30] Foreign Application Priority Data

Sept. 23, 1966 France..........................77458

[52] U.S. Cl. .....................................324/0.5 R
[51] Int. Cl.................................................G01r 33/08
[58] Field of Search..................324/0.5; 331/3, 94

[56] References Cited

UNITED STATES PATENTS

| 3,150,313 | 9/1964 | Dehmelt | 324/0.5 |
| 3,192,472 | 6/1965 | Bender | 324/0.5 |

Primary Examiner—Michael J. Lynch
Attorney—Flynn & Frishauf

[57] ABSTRACT

A vessel, filled with a vapor, the quantum transition of which is to be detected, has photosensitive transducer means applied around the walls thereof in a region remote from the axis of a pumping beam applied to the vessel, so that the photosensitive transducers are responsive to essentially all radiated energy impinging on the walls of the vessel at random angles with respect to the axis of the pumping beam; the cell is included in apparatus including an RF generator of variable frequency, the output of which is coupled to the cell to generate within the cell a radio-frequency electromagnetic field. The frequency of the RF generator is controlled by a feedback control circuit coupled to the output from the photosensitive transducers, so that, when their output is a maximum, the frequency of the RF generator will be locked in.

5 Claims, 5 Drawing Figures

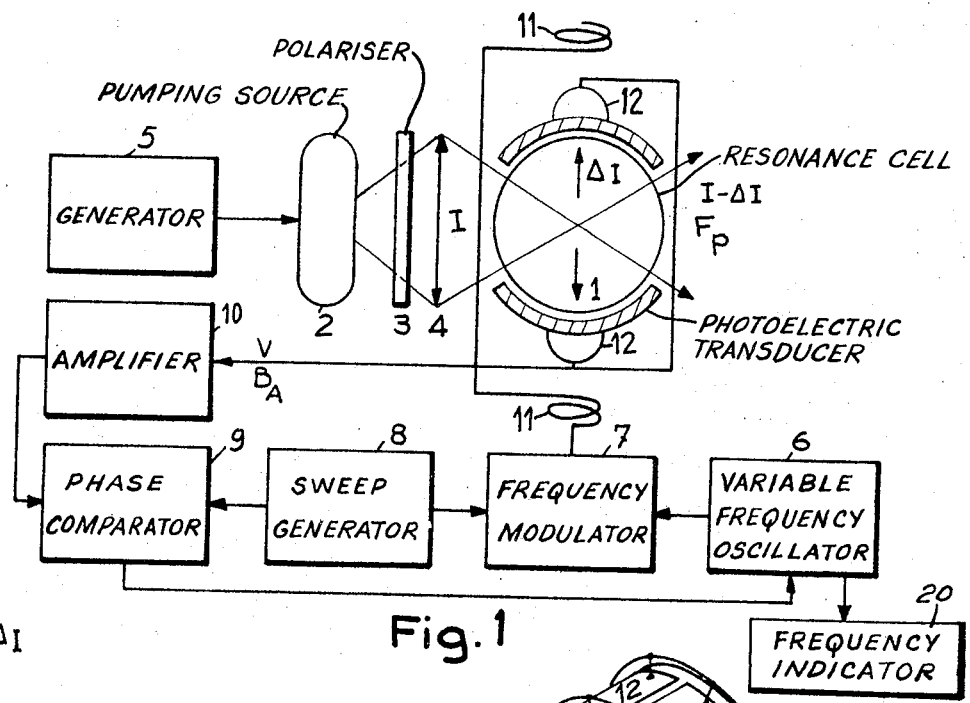
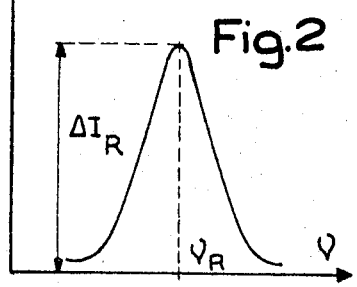
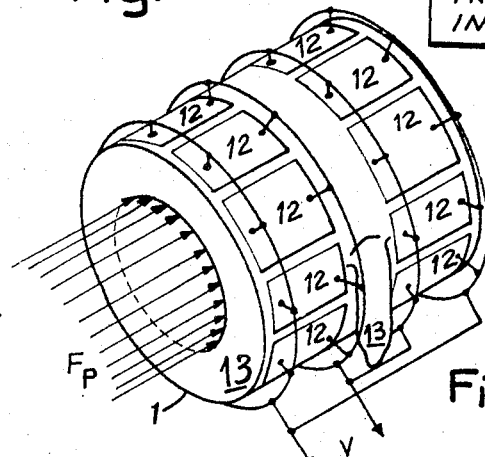
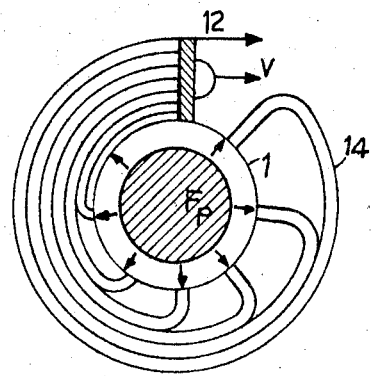
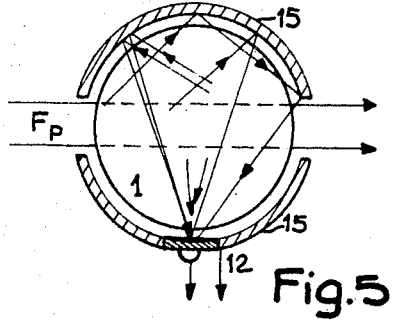

3,651,394

DIFFUSED LIGHT DETECTING CELL FOR AND IN OPTICAL PUMPING APPARATUS

The present application is a continuation-in-part application of our prior application, Ser. No. 667,557, filed Sept. 13, 1967, now abandoned.

The present invention relates to optical detection systems of radiofrequency transitions which take place under the action of an incident radiofrequency electromagnetic field in an optically pumped vapor.

In known optical pumping atomic clocks and magnetometers, a vapor is contained in a resonance cell, interposed between a source of light and a photoelectric transducer. The variations in the transparency of the vapor control the frequency of an oscillator to make it correspond to at least one of the transitions which may be caused by the radiofrequency electromagnetic field. The signal supplied by the transducer includes noise which exceeds in intensity that of the amplifier to which the transducer is connected. This drawback is due to the fact that the transition is by light absorption. In addition, the position of the transducer in the prolongation of the beam of light emitted by the pumping source results in a bulky arrangement.

It is an object of the invention to avoid these drawbacks.

SUBJECT MATTER OF THE PRESENT INVENTION

Briefly, the cell is so constructed that essentially radiated energy derived from the vapor within the cell is picked up by a photoelectric transducer means. This is accomplished by applying photosensitive transducers to the walls of the vessel at a region remote from the axis of the pumping beam. THese transducers may be either photo cells, combinations of light pipes such as optical fibers to terminate in a photoelectric transducer cell, or spherical or similar mirrored surfaces reflecting light impinging on the walls of the vessel towards one or more pickups. The sensed energy by the transducers is then utilized to control the frequency of an oscillator to correspond to one of the transitions. The signal obtained from the cells and responsive to essentially all the radiated energy impinging on the walls of the vessel will be substantially in excess of noise, and will be sharply defined so that positive control of the frequency of the oscillator, in an automatic feedback loop, is easily obtained. The frequency of the generator can then be determined and indicated by any well known frequency meter.

The invention will be described by way of example with reference to the accompanying drawings, wherein:

FIG. 1 is a diagram of the optical pumping system according to the invention;

FIG. 2 is an explanatory graph;

FIG. 3 is a first embodiment of the photoelectric pickup device according to the invention; and FIGS. 4 and 5 show further embodiments of the photoelectric pickup device.

FIG. 1 shows an optical pumping system for detecting the light diffused by an optically pumped cell in accordance with the invention. It comprises a resonance cell 1 containing an alkali vapor, an optical pumping source 2, a polarizer 3, a lens 4, a generator 5, which feeds the source 2, and inductor 11 associated with the cell 1 and a photoelectric transducer arrangement 12 located outside the light beam $F_p$, focused by the lens 4. It comprises furthermore a variable frequency generator 6, the frequency of which is indicated on indicator 20, a frequency modulated stage 7, a modulating sweep generator 8, a phase comparator 9 and an amplifier 10.

The source 2, which is supplied by the generator 6 illuminates the resonance cell 1 through the polarizer 3 and the lens 4 in order to irradiate the vapor in the cell 1 by means of the beam $F_p$. The beam has at the input of the cell an intensity I and at the output of it an intensity $I - \Delta I$. The light of the beam $F_p$ is circularly polarized and has a suitable wavelength to give rise to an optical pumping which changes with the atom population of the energy levels of the vapor. Once the vapor has been pumped it absorbs merely a light intensity $\Delta I$ which is negligible, because it is just sufficient for the optical pumping to produce sufficient transitions for neutralizing the spontaneous process which tends to restore the vapor to its original state of equilibrium. If the optically pumped vapor is submitted to the action of a radiofrequency electromagnetic field with such a frequency $\nu$ that the product $h\nu$, $h$ being the Plank constant, corresponds to the energy gap corresponding to a transition, the process of equalizing the populations is substantially intensified, as well as the amount of energy picked up from the pumping beam $F_p$ by the cell. This energy is radiated by the vapor in all directions, that is, at random angles with respect to the axis of the optical pumping beam, in the form of diffused light which is collected by the photoelectric transducers 12 located outside the pumping beam $F_p$. One thus obtains a resonance signal V, whose amplitude is at a maximum when the frequency $\nu$ of the radiofrequency electromagnetic field coincides with the radiofrequency $\nu_R$ which is a physical characteristic of the vapor.

FIG. 2 shows the light intensity $\Delta I$ diffused by the vapor as a function of the frequency $\nu$ of the radiofrequency electromagnetic field applied to the resonance cell. This resonance curve makes it possible to lock the oscillator frequency $\nu_0$ on the frequency $\nu_R$, as shown below.

The oscillator 6 of the arrangement of FIG. 1 supplies a signal which is frequency modulated in a modulation stage 7 by the sweep signal from the modulator 8. Modulation stage 7 supplies the inductors 11 surrounding the resonance cell 1 with a signal at a frequency $\nu$ which varies about the frequency $\nu_0$ of the oscillator 6 as a function of the sweep signal of the modulator 8. The voltage V delivered by the photoelectric transducers 12 varies with the sweep signal with a phase which changes its sign when the frequency $\nu_0$ passes through the value $\nu_R$. After amplification by the amplifier 10, the voltage V is compared with the sweep signal in the phase comparator 9, which generates an error voltage controlling the frequency $\nu_0$ of the oscillator 6. Due to this control of the phase, the oscillator 6 remains locked to the frequency $\nu_R$, corresponding to the peak of the resonance curve shown in FIG. 2, which can be read off indicator 20.

The precision of the frequency locking of the oscillator 6 depends on the gain of the control loop which is limited only by the signal-to-noise ratio of the transducer and the amplifier. It is therefore essential that this ratio should be the best possible to permit the accurate locking of the oscillator to the frequency $\nu_R$ of the resonance line of the vapor. In known systems, the photoelectric transducers are located in the prolongation of the beam $F_P$ and receive a light intensity $I - \Delta I$, substantially equal to the intensity I of the incident light. As is known, the signal-to-noise ratio can therefore be expressed as follows $$S/N = \frac{\Delta I}{\alpha \sqrt{I} + B_A},$$

where $\alpha$ is a constant, and $B_A$ is the amplitude of the noise attributable to the amplifier.

In the system according to the invention, the signal-to-noise ratio is more favorable, because it is expressed by:

$$S/N = \frac{\Delta I}{\alpha \sqrt{\Delta I} + B_A}$$

If an amplifier with very low noise is used, the improvement of the noise-to-signal ratio is very substantial, since $\Delta I$ is much lower than I.

FIG. 3 shows a first embodiment of the resonance cell equipped with transducers according to the invention. It comprises a cylindrical vessel 1 with its axis parallel to the parallel beam $F_p$. The periphery of the vessel 1 is surrounded by photoelectric elements 12 which are interconnected and capture only the light diffused by the vapor contained in the vessel 1 outside the extent of the pumping beam. A curved tank 13 contains the metal which is vaporized in the vessel.

FIG. 4 shows an end view of a second embodiment of the transducer which picks up the light diffused by the vapor being pumped. The beam $F_p$ is still directed to the axis of the cylindrical vessel 1 whose cross section is shown. The periphery of the vessel is equipped with optical fibers 14 which collect the diffused light and transmit the same to a photoelectric element 12 which supplies the resonance signal V.

FIG. 5 shows a cross section of a third embodiment of the photoelectric collector according to the invention. The cell comprises a spherical vessel 1 containing the alkali vapor; a spherical reflecting cavity 15 surrounds this vessel so as to converge the light energy diffused by the vapor outside the beam $F_p$ towards a photoelectric transducer 12. The pumping beam $F_p$ irradiates the vapor through holes in the cavity 15.

The system according to the invention may be used for building up an atomic clock or a magnetometer with optical pumping, of a high degree of precision of frequency locking and having substantially reduced dimensions.

Of course, the invention is not limited to the embodiments described and shown which were give solely by way of example.

We claim:

1. Cell for detecting quantum transition of a vapor in an optical pumping apparatus comprising
   a vessel (13) filled with said vapor;
   means (5, 2, 3, 4) generating an optical pumping beam and directing said optical pumping beam through said vessel along a predetermined axis;
   photosensitive transducer means (FIG. 2 : 12 ; FIG. 4 :14, 12; FIG. 5 :15, 12) applied to the walls of the vessel at a region remote from the axis of said optical pumping beam and located to be responsive to essentially all radiated energy from said vapor within said vessel impinging on the walls of the vessel at random angles with respect to the axis of said optical pumping beam upon irradiation of the cell by said beam;
   an RF generator (6) of variable frequency;
   means (11, 7) electrically connected to and coupled to said generator and electromagnetically coupled to said cell generating within said cell a radiofrequency electromagnetic field;
   and means (12, 10, 9) controlling the frequency of said RF generator (6) upon sensing of maximum response by said transducer means which sense essentially all energy impinging on the walls of the vessel, including a feedback control circuit (10–9–8 ; 6) coupled to the output from said photosensitive transducer means and controlling the frequency of said RF generator.

2. Cell in the apparatus of claim 1, wherein said cell is a cylindrical cell having an axis parallel to said beam;
   and said transducer means comprises a plurality of photoelectric transducer elements positioned about the wall of said cylindrical cell.

3. Cell in the apparatus of claim 1, wherein said cell is a cylindrical cell having an axis parallel to said beam;
   and said photosensitive transducer means comprises bundles of optical fibers (14) and at east one photoelectric transducer element (12), said optical fibers optically coupling the walls of said vessel at a region remote from the axis of the pumping beam to said photoelectric transducer element, so that said photoelectric transducer element will respond essentially to all radiated energy impinging on the walls of the vessel at random angles with respect to the axis of the pumping beam.

4. Cell in the apparatus of claim 1, wherein said photosensitive transducer means (12) comprises a hollow spherical reflector (15) surrounding said cell;
   said reflector having an inlet and an outlet opposite said inlet for permitting said beam to pass through said reflector without incidents thereon, and at least one photoelectric transducer element mounted within said reflector and collecting light impinging on the walls of said reflector at random angles with respect to the axis of said pumping beam and upon reflection thereof on said reflector.

5. Cell in the apparatus of claim 1, including means (20) indicating the frequency of said RF generator when the energy output from said photosensitive transducer means is a maximum.

* * * * *